May 18, 1948.  M. MENNECIER  2,441,894
FLEXIBLE PACKER TESTER
Filed Sept. 5, 1941  8 Sheets-Sheet 1

INVENTOR:
MAURICE MENNECIER
BY
Hoquet, Neary & Campbell
ATTORNEYS

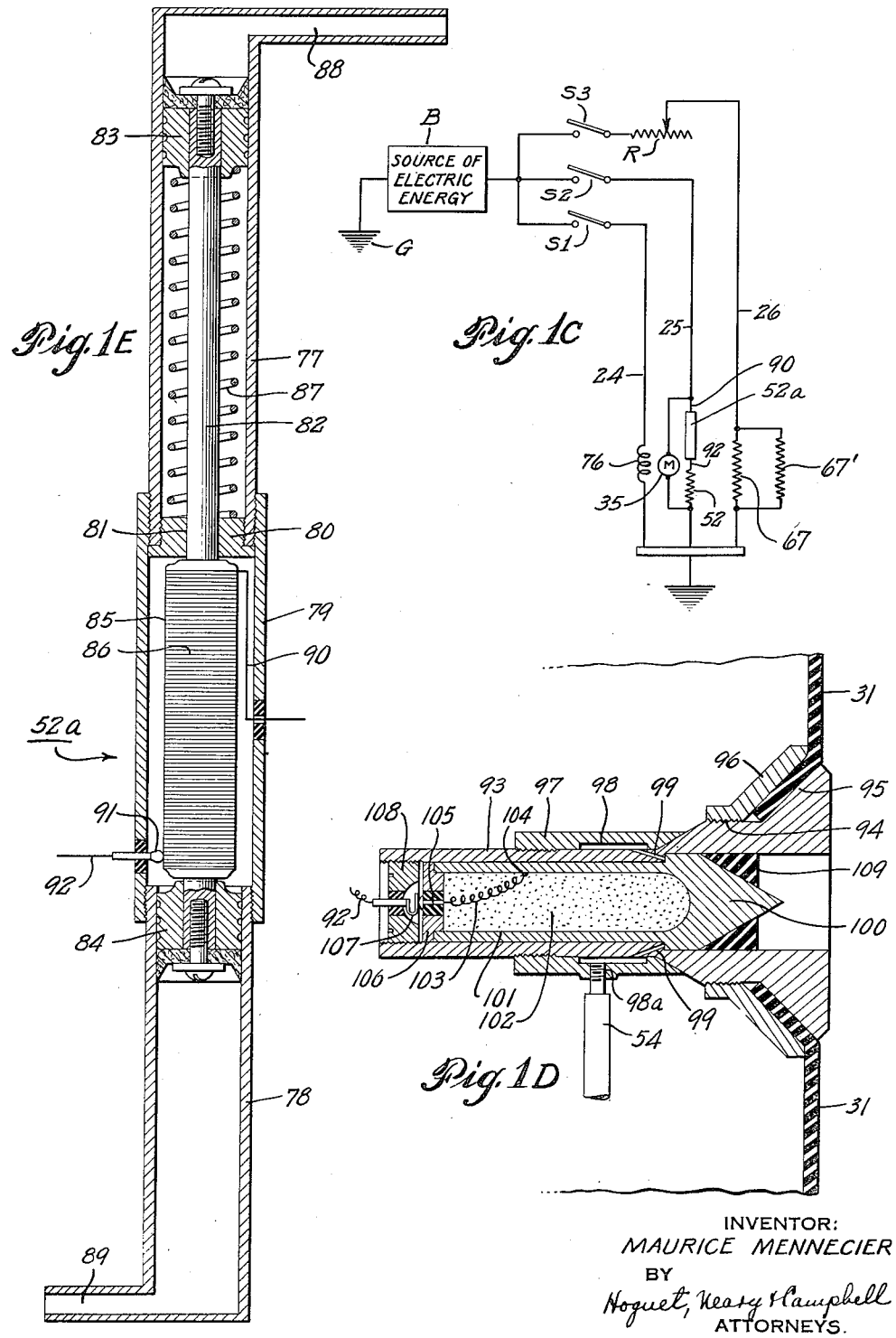

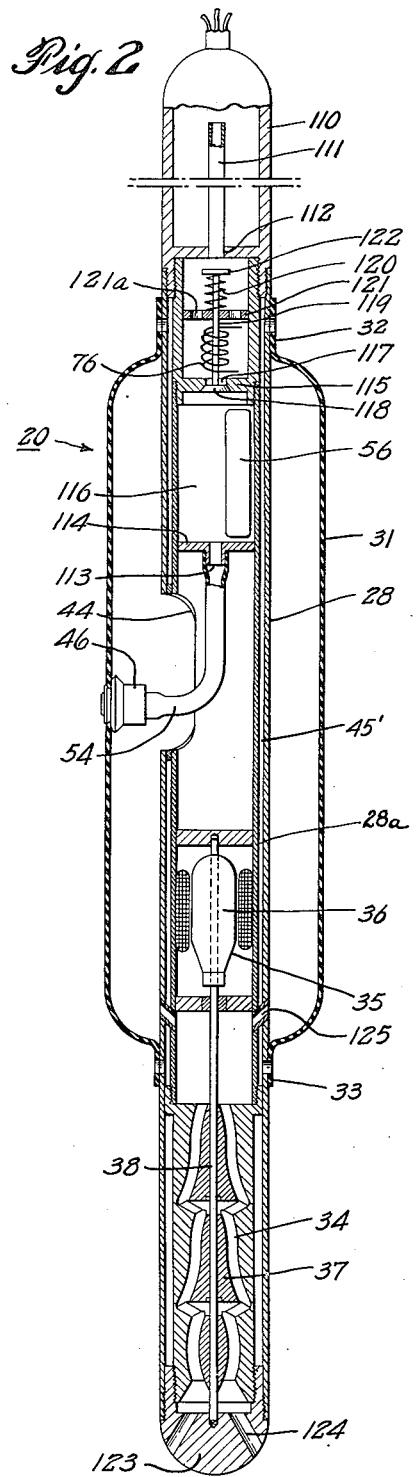

May 18, 1948.  M. MENNECIER  2,441,894
FLEXIBLE PACKER TESTER
Filed Sept. 5, 1941    8 Sheets-Sheet 4

INVENTOR:
MAURICE MENNECIER
BY
Hoguet, Neary & Campbell
ATTORNEYS

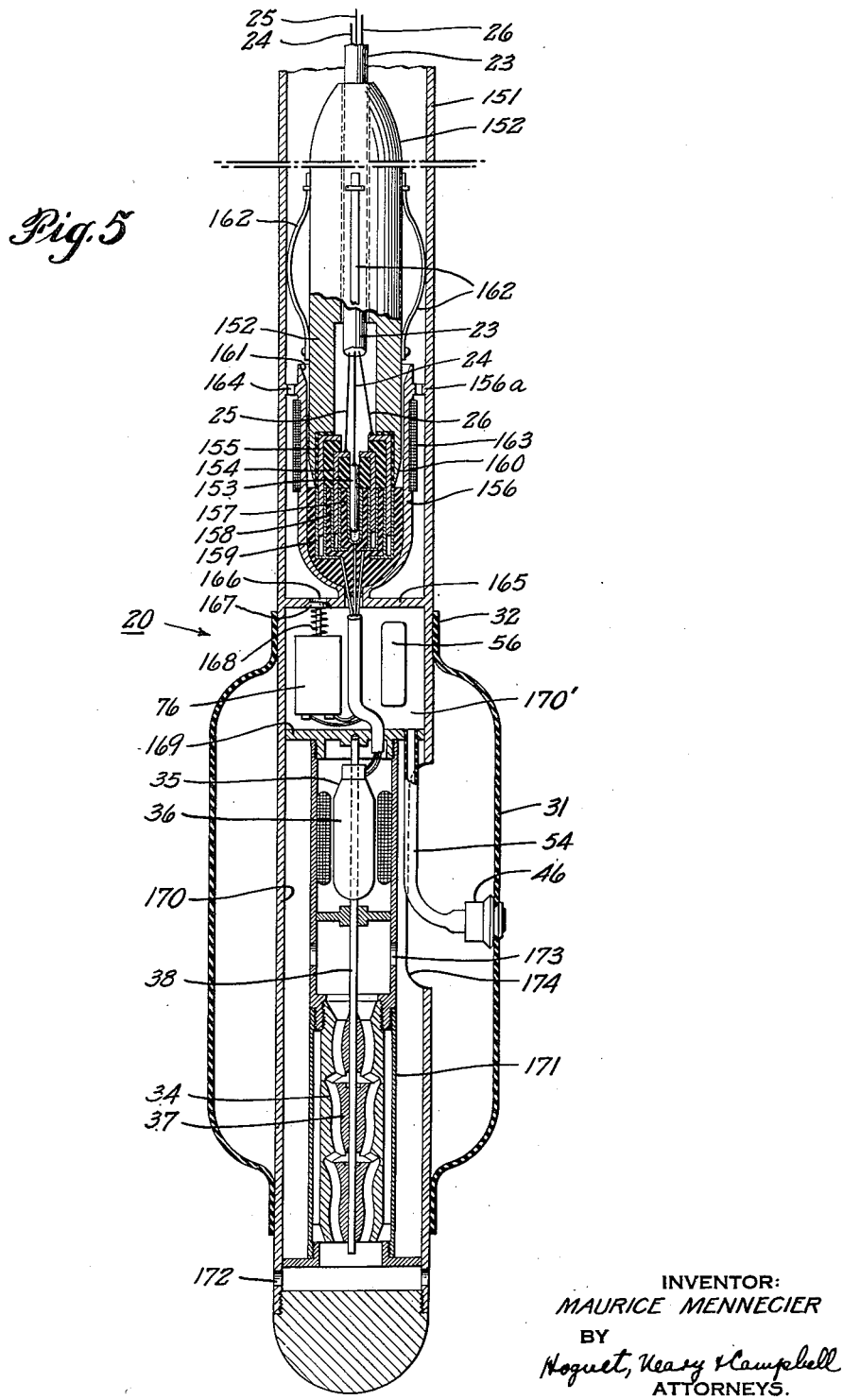

May 18, 1948. M. MENNECIER 2,441,894
FLEXIBLE PACKER TESTER
Filed Sept. 5, 1941 8 Sheets-Sheet 6
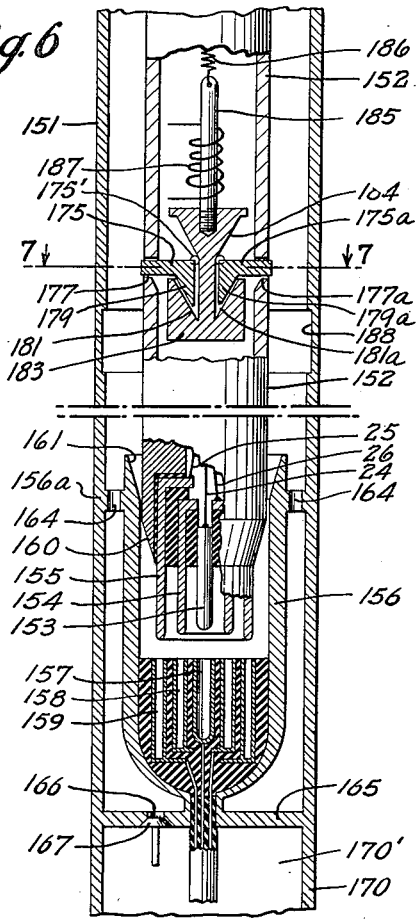
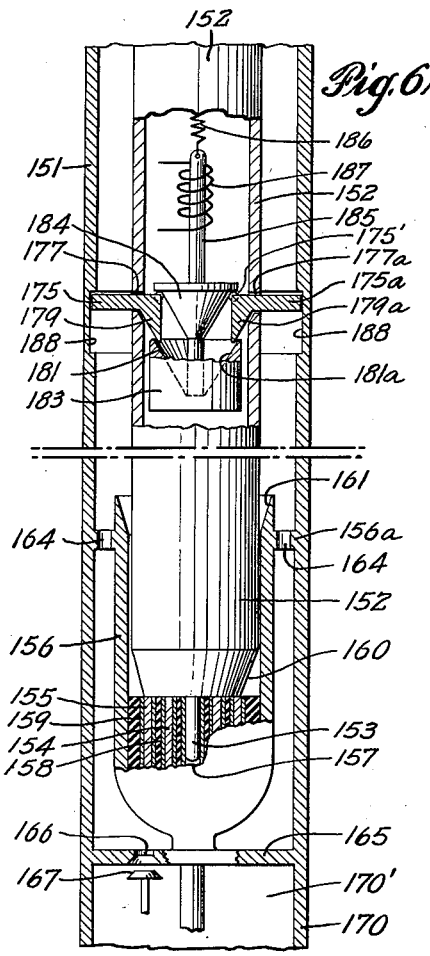
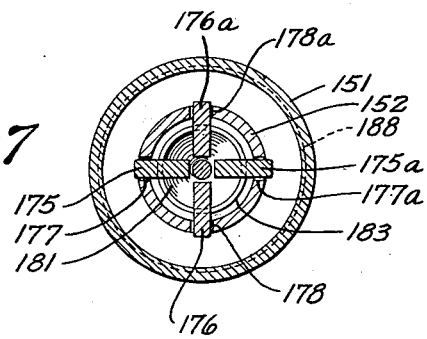
INVENTOR:
MAURICE MENNECIER
BY
Hoguet, Neary & Campbell
ATTORNEYS.

May 18, 1948.  M. MENNECIER  2,441,894
FLEXIBLE PACKER TESTER
Filed Sept. 5, 1941  8 Sheets-Sheet 7

INVENTOR:
MAURICE MENNECIER
BY
Hoguet, Neary & Campbell
ATTORNEYS.

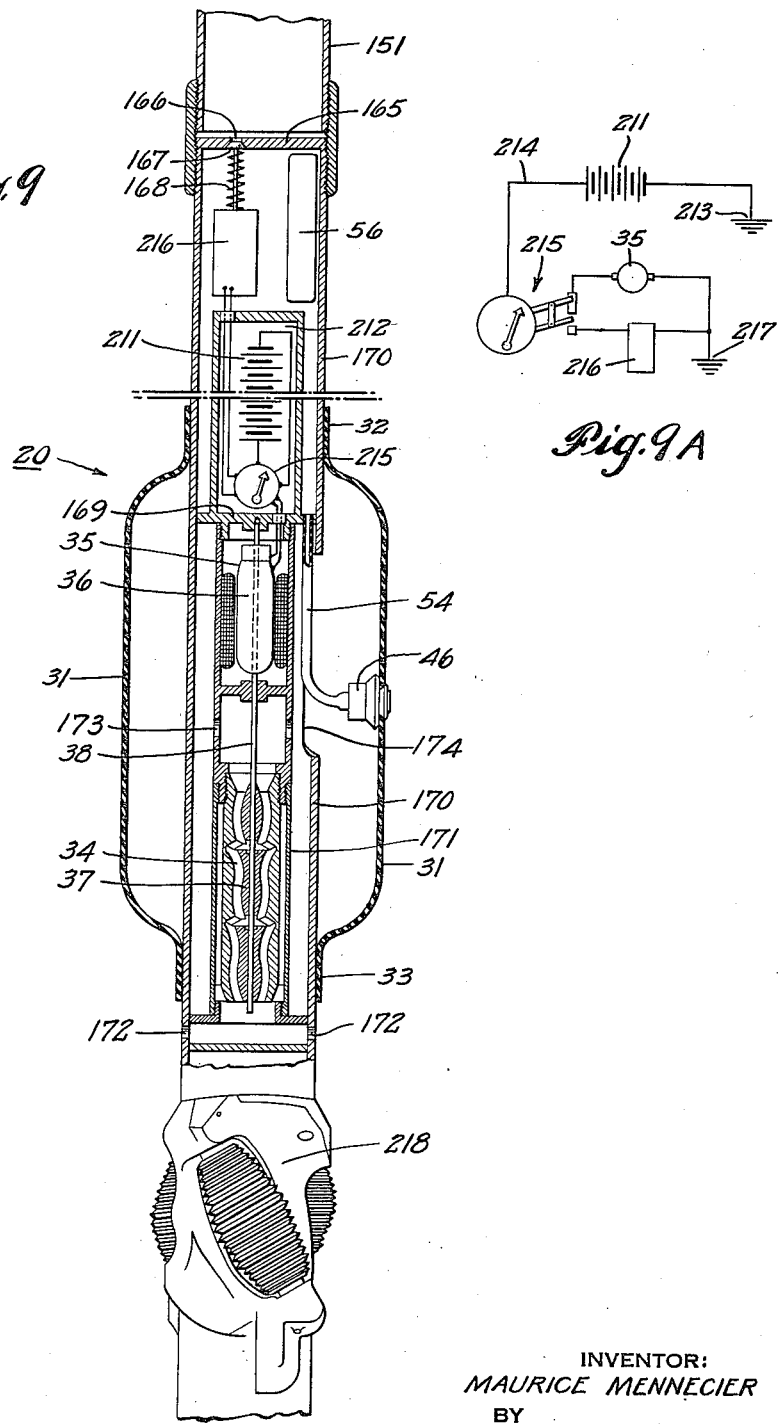

Patented May 18, 1948

2,441,894

UNITED STATES PATENT OFFICE 2,441,894

FLEXIBLE PACKER TESTER

Maurice Mennecier, San Fernando, Trinidad, British West Indies, assignor to Schlumberger Well Surveying Corporation, Houston, Tex., a corporation of Delaware Application September 5, 1941, Serial No. 409,605

4 Claims. (Cl. 166—1)

This invention relates to well testing apparatus and more particularly to new and improved apparatus for formation and casing testing in deep oil and gas wells.

Formation and casting tests are generally made at the present time by employing one or more packers of conventional type to isolate a portion of a bore hole from the liquid contained therein in order that a sample of any liquid in the surrounding formations may be obtained. The packers are usually lowered into the bore hole on a string of drill pipe and are designed to be expanded into engagement with the wall of the bore hole or the casing by the application of weight thereto.

In rat-hole testing, the bore hole is provided with a portion of reduced diameter forming a shoulder on which is seated a tapered packer, known in the art as a rat-hole packer. A seal is formed by applying great weight, usually several tons or more, to the packer in order to force it against the shoulder, and a sample is obtained of the liquid in the rat-hole below the packer.

Testing with packers of this type has not been found particularly satisfactory because of the difficulty of forming an effective seal. When the test is being made, the pressure below the packer is relatively low, so that the packer is required to support the huge pressure created by the column of liquid in the bore hole. At the relatively great depths encountered in practice, this pressure is so great that the packer tends to become deformed, eventually rupturing and permitting the bore hole fluid to seep into the rat-hole. In addition, this method does not lend itself to the testing of thin zones because the sample is taken from the entire length of the rat-hole beneath the packer, which may be much greater than the thickness of the zone it is desired to test.

If a full-hole packer is disposed above the rat-hole packer, as is frequently the case in tests in deep holes, it will also tend to slide down the hole when the rat-hole packer gives way.

When it is desired to test a formation which lies intermediate the top and bottom of a bore hole, the formation is generaly isolated by one or more full-hole packers. These are made of flexible or semi-flexible material such as rubber, for example, and they are usually expanded to engage the walls of the bore hole or casing by applying weight to the drill stem on which they are mounted.

In order to retain the packer in position, a tail pipe extending to the bottom of the bore hole must be employed. Obviously, its length must be chosen so that the packer will be located at the proper depth in the bore hole. Testing in this fashion is time consuming and costly because when tests are to be made at different depths, the drill pipe and testing apparatus must be removed from the bore hole after each test in order that the length of the tail-pipe may be altered.

In the present practice, the zone being tested is usually placed in communication with a sample collecting receptacle by means of suitable valve means actuated by rotating or translating the drill pipe along its axis. In deep wells, that is, wells up to about 15,000 feet in depth, there is considerable friction between the drill pipe and the walls of the bore hole, and small amounts of motion imparted to the drill pipe at the surface are not duplicated at the bottom.

An object of the present invention, accordingly, is to provide a new and improved apparatus for formation and casing testing in bore holes drilled into the earth which is free from the above noted defects of the prior art.

Another object of the invention is to provide apparatus of the above character which combines safety with positive action and enables testing and/or pressure recording operations to be satisfactorily accomplished in a small fraction of the time now required for such operations.

A further object of the invention is to provide apparatus in which the packer does not have to support the weight of the column of liquid in the bore hole, whereby it will function with equal efficiency at any depth or pressure therein.

A still further object of the invention is to provide apparatus of the above character which is adapted to test a very narrow zone within a bore hole without requiring a rat-hole shoulder.

Another object of the invention is to provide a new and improved apparatus of the above character which does not utilize weight to expand the packer to form a seal with the walls of the bore hole or casing.

A further object of the invention is to provide a new and improved bore hole packer which not only divides the hole into two sections, isolating one section from the other, but in addition, seals the hole immediately above and below the point from which the test fluid is extracted, and supports the tested formation during the testing operation.

Another object of the invention is to provide a new and improved bore hole packer which is adapted to seal off the formation effectively at any desired depth, and which does not tend to slip down the hole during the testing operations.

Still another object of the invention is to provide means for recording the actual pressure of the formation at the level of the packer.

A further object of the invention is to provide a new and improved apparatus of the above character for testing bore holes which may be used either on a drill pipe or on a cable.

Another object of the invention is to provide a drill stem tester, the valves of which are operated without any vertical or rotary motion of the drill pipe.

Additional objects and features of the invention will become apparent from the following detailed description of several preferred embodiments taken in connection with the accompanying drawings, in which:

Figure 1C is a schematic diagram of the electrical circuits for the apparatus of Figure 1;

Figure 1D is an enlarged view in section illustrating a modified form of fluid inlet;

Figure 1E is a view in section of a detail of the apparatus shown in Figure 1;

Figure 2 is a view in longitudinal section of a modified form of testing apparatus in which the container for the test fluid is placed above the packer whereby tests may be made of formations near the bottom of a bore hole;

Figure 3 is a view in longitudinal section of another form of testing apparatus in which the packer is provided with a non-expanding portion in which the fluid inlet is located;

Figure 5 is a view in longitudinal section of another embodiment of the invention which is adapted to be lowered into the bore hole on a drill pipe which serves as the sample receiving chamber;

Figures 6 and 6A are views partially in section of a modified form of plug and socket device for use with the apparatus shown in Figure 5;

Figure 7 is a view in section taken along line 7—7 of Figure 6;

Figure 9 is a view in partial longitudinal section of testing apparatus adapted to be lowered into a bore hole on a drill pipe in which the source of electrical energy and the control apparatus are located in the bore hole;

Figure 9A is a schematic diagram of the electrical circuits employed in the apparatus of Figure 9.

Figure 1:
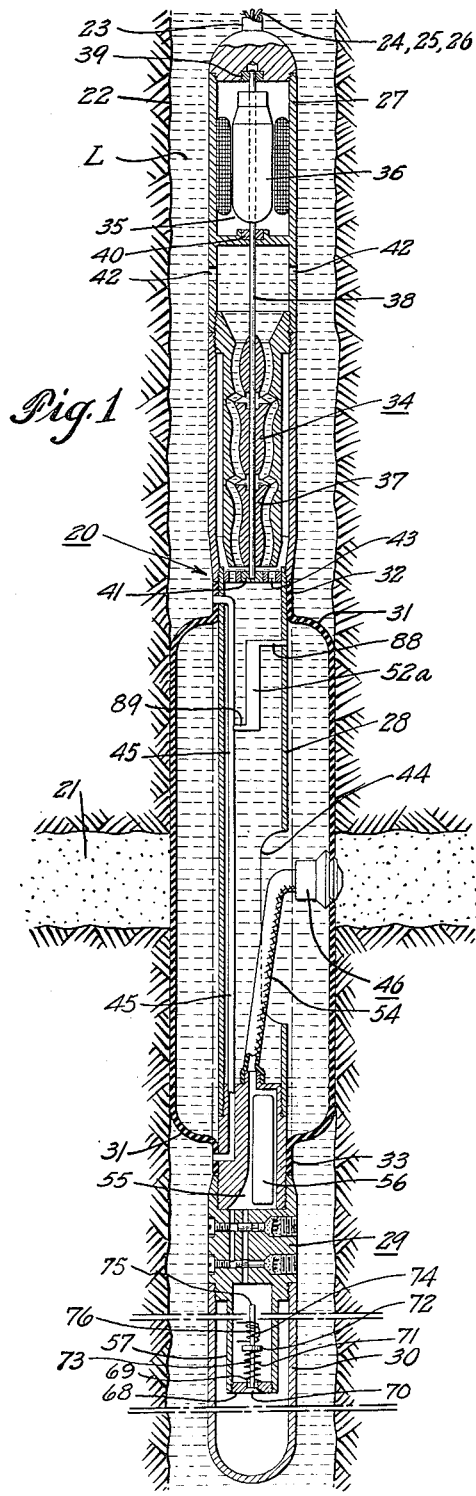
Figure 1 is a view in longitudinal section of testing apparatus constructed according to the invention, showing the packer in the expanded position.

Referring now to Figure 1, testing apparatus 20 constructed according to the invention is shown located at a given level in a bore hole 22 in the vicinity of a formation 21 to be tested. The testing apparatus 20 is suspended in the bore hole 22 on a cable 23 containing a plurality of conductors 24, 25 and 26 which connect the various control circuits therein to a source of electrical energy and suitable control apparatus at the surface of the earth. The cable winch for raising and lowering the testing apparatus 20 in the bore hole 22 and the other necessary surface equipment are well known and are not described or illustrated herein.

The testing apparatus 20 comprises a plurality of cylindrical casings 27, 28 and 30 and a valve block 29, which are threadedly or otherwise secured together to form the assembled apparatus. The packer 31 comprises a cylindrical member made of flexible material such as rubber, for example, the upper and lower ends 32 and 33, respectively, of which are cemented, vulcanized, clamped or otherwise secured to the casing 28 to form a pressure tight joint. In its normal unexpanded position, the packer 31 lies flat upon the outer surface of the casing 28, as shown in dotted lines in Figure 1.

The packer 31 is adapted to be expanded by a suitable turbine mechanism 34 which is mounted in the lower portion of the uppermost casing 27 and which is adapted to be driven by means of an electric motor 35. To this end, the rotor 36 of the motor 35 and the rotor 37 of the turbine mechanism 34 are mounted upon a common shaft 38 journaled in suitable bearings 39, 40 and 41. One terminal of the motor 35 is grounded to the testing apparatus 20 (Fig. 1C) and its other terminal is connected through the conductor 25 in the cable 23, and conventional switching means S2 to a source of electrical energy B which is grounded at G.

A plurality of inlet ports 42 are provided in the casing 27 through which the liquid L in the bore hole 22 may be supplied to the turbine 34. The fluid output of the turbine 34 is supplied through a plurality of outlet ports 43, the interior of the casing 28 and through an aperture 44 formed in the side wall thereof to the interior of the flexible packer 31.

The function of the turbine mechanism 34 is to create a pressure differential between the inside of the packer 31 and the liquid L in the bore hole 22 which is sufficiently great to expand the packer into engagement with the wall of the bore hole 22. In order to equalize the pressure above and below the packer 31 after it has been expanded into the position shown in Figure 1, a conduit 45 is provided which extends lengthwise through the casing 28 and communicates with the bore hole liquid L above and below the packer 31. It will be apparent, therefore, that the packer 31 will not tend to slip down the bore hole 22 since it does not have to sustain the enormous weight of the column of liquid L contained therein.

Figure 1A:
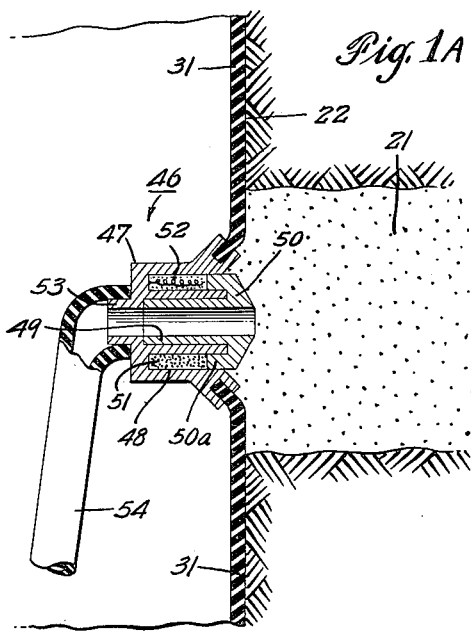
Figure 1A is an enlarged partial view in section of the fluid inlet means shown in Figure 1.

Mounted in the wall of the packer 31 and intermediate the ends thereof is a fluid inlet 46 through which the fluid sample from the formation 21 to be tested is adapted to be obtained. The fluid inlet 46 is shown in greater detail in Figure 1A and it comprises a tubular member 47 having an annular axially extending recess 48 formed therein. Slidably mounted in the tubular member 47 is a hollow projectile 49 having a laterally extending flange 50 thereon provided with a rearwardly extending lip 50a which is adapted to fit snugly within the recess 48. The annular recess 48 forms a powder chamber containing an explosive charge 51 which is adapted to be ignited by means of an electric filament 52. The filament 52 is connected in parallel with the motor 35 (Fig. 1C) through pressure controlled mechanism 52a illustrated in greater detail in Figure 1E, for delaying its ignition until the packer 31 has been expanded.

Referring now to Figure 1E, the ignition delaying means 52a comprises a pair of tubular members 77 and 78 connected together by means of an elongated coupling member 79. The lower end of the tubular member 77 is provided with a plug 80 having an aperture 81 therein within which a piston rod 82 is adapted to be slidably received. At the upper and lower extremities, respectively, of the piston rod 82 are secured a pair of snugly fitting pistons 83 and 84, respectively, which are adapted to slide within the tubular members 77 and 78, respectively.

On the lower end of the piston rod 82 is mounted a cylindrical member 85 having a conventional type resistance winding 86 thereon. The cylindrical member 85 and the winding 86 are normally maintained within the coupling member 79 by means of a biasing spring 87, the lower end of which is seated on the plug 80 and the upper end of which engages the lower face of the piston 83.

The upper end of the tubular member 77 communicates through a conduit 88 with the space between the packer 31 and the casing 28 so that the piston 83 is subjected to whatever fluid pressure may exist in that space. The lower end of the tubular member 78 communicates through a conduit 89 with the conduit 45 in the casing 28 so that it is subjected to the pressure of the bore hole liquid L at the level of the testing apparatus 20 in the bore hole. Accordingly, whenever there is a pressure differential between the interior of the packer 31 and the liquid L in the bore hole 22, the winding 86 and the cylindrical member 85 will be moved downwardly against the compression spring 87 into the tubular member 78.

The upper end of the resistance winding 86 is connected through a conductor 90 to the conductor 25 in the cable 23 (Fig. 1C). The lower end of the resistance winding 86, for the position shown in Figure 1C, engages a contact member 91 which is mounted in the coupling member 79 and is insulated therefrom. The contact member 91 is connected through a conductor 92 to one end of the filament 52 in the recess 48 in the fluid inlet 46. As shown in greater detail in Figure 1C, the filament 52 is connected in series with the ignition delaying means 52a and the two are connected in parallel with the motor 35.

When the packer 31 is in its normal unexpanded position, shown in dotted lines in Figure 1, there is no pressure differential acting upon the pistons 83 and 84. However, as the packer 31 is expanded into engagement with the wall of the bore hole by the operation of the turbine 34, an increasing differential pressure is created which moves the resistance winding 86 downwardly into the tubular member 78. This decreases the amount of resistance in series with the igniting filament 52 so that the current therethrough begins to increase until at the pressure required to expand the packer 31 fully, sufficient resistance has been cut out to cause the filament 52 to ignite.

It will be apparent, therefore, that when the switch S2 is closed at the surface of the earth, the motor 35 will begin to rotate, thereby operating the turbine 34, but the igniting filament 52 will not be ignited until the packer 31 has been fully expanded against the formation as shown in Figure 1. If desired, the resistance winding 86 could be replaced by contact making means adapted to engage the contact 91 at a predetermined pressure differential.

The fluid inlet 46 is provided at the rear end thereof with a tubular portion 53 to which is secured a flexible high pressure tube 54, the lower end of which communicates with a chamber 55, within which may be disposed a conventional type pressure recorder 56. Below the chamber 55 is disposed the valve block 29, shown in greater detail in Figure 1B, which includes valve means for controlling communication between the chamber 55 and a sample container 57 mounted on the valve block 29 and extending into the lowermost casing 30.

Figure 1B:
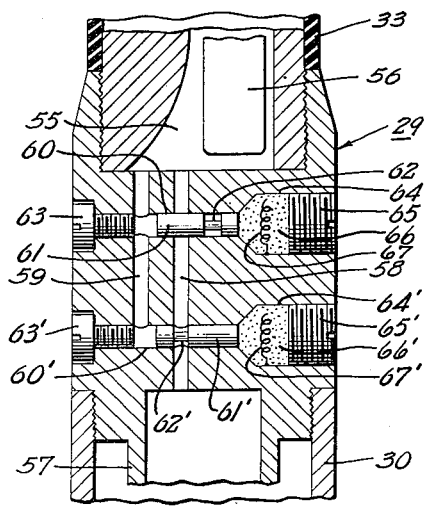
Figure 1B is an enlarged view in section of the valve means in the testing apparatus shown in Figure 1.

Considering now Figure 1B, the valve block 29 has formed therein a longitudinally extending passage 58 for placing the chamber 55 in communication with the sample container 57, and a second longitudinal passage 59 which does not extend completely through the valve block 29. In the upper portion of the valve block 29, and intersecting the passages 58 and 59, is formed a transversely extending passage 60 within which is snugly fitted a cylindrical valve member 61. The valve 61 is formed with a portion 62 of reduced diameter which is adapted to permit the passage of fluid through the passageway 58 when the valve has been actuated as described in greater detail hereinafter.

One end of the cylindrical passage 60 is plugged by means of a conventional type screw 63 and the other end communicates with a cylindrical recess 64 of larger diameter which is closed off by means of a screw type plug 65 and which constitutes a powder chamber containing an explosive charge 66. The explosive charge 66 is adapted to be ignited by means of a conventional type filament 67, one end of which is grounded to the valve block 29 and the other end of which is connected through the conductor 26 in the cable 23, conventional switching means S3 and a variable resistance R, to the source of electrical energy B at the surface (Fig. 1C).

Directly below the passage 60 is disposed a second transversely extending passage 60′ in which is snugly fitted a valve 61′. The valve 61′ is provided with a portion 62′ of reduced diameter which normally registers with the passage 58 but which is adapted to be actuated as described in greater detail hereinafter to block the passage 58 in the valve block 29. One end of the passage 60′ is plugged by a conventional type screw 63′ and the other end communicates with a cylindrical recess 64′ of larger diameter which is closed off by a screw type plug 65′, thereby constituting a powder chamber containing an explosive charge 66′. The explosive charge 66′ is adapted to be ignited by means of a filament 67′ which is connected in parallel with the filament 67. The filaments 67 and 67′ are resistances of different magnitudes and may be ignited separately by controlling the current flowing in the conductor 26 by adjusting the variable resistance R (Fig. 1C).

The sample container 57 (Fig. 1) is disposed coaxially within the casing 30 which also forms a sample container to receive fluid from the formation 21. The lower end of the sample container 57 is closed off by means of a plug 68 in which is formed an aperture 69 constituting a seat for a valve 70. The valve 70 is maintained normally in engagement with the seat 69 by means of a compression spring 71, the lower end of which is seated against the upper face of the plug 68 and the upper end of which engages a disc 72 on the stem 73 on which the valve 70 is mounted.

The valve stem 73 is provided with a portion 74 made of a non-magnetic material, such as brass, for example, and a portion 75 thereabove made of magnetic material, such as iron, for example. The portion 75 of the valve stem 73 extends through and projects beyond a solenoid 76. The solenoid 76 is grounded at one end to the testing apparatus 20 and is connected at its other end through the conductor 24 in the cable 23, a conventional type switching means $S_1$, to the source of electrical energy B at the surface of the earth (Fig. 1C). When the solenoid 76 is energized by closing the switch $S_1$ at the surface, the magnetic portion 75 of the valve stem 73 is pulled downwardly within the solenoid 76, thereby opening the valve 70.

In operation, the testing apparatus 20 is lowered into the bore hole 22 until the fluid inlet 46 is directly opposite the formation 21 from which a sample is to be obtained. The motor 35 is then energized by closing the switch $S_2$ at the surface of the earth. This drives the turbine 34, creating a differential pressure between the liquid L in the bore hole 22 and the space between the packer 31 and the casing 28. The differential pressure thus created expands the packer 31 into engagement with the wall of the bore hole 22, as shown in Figure 1.

It will be noted that since the expansion of the packer 31 is dependent only upon the creation of the differential pressure noted above, it is not influenced in any way by the ambient pressure in the bore hole 22. Accordingly the packer 31 may be expanded with equal efficiency at any depth and under any pressure.

The packer 31 in its expanded position seals off the wall of the bore hole 22, isolating the formation 21 from the rest of the hole 22 and at the same time forcing the fluid inlet 46 into engagement with the formation 21 which is to be tested. Since the packer 31 is forced against the formation 21 by the differential pressure created by the turbine 34 it tends to support it and prevents it from caving in during the testing operation.

The closing of the switch $S_2$ also energizes the filament 52. However, at the instant the switch $S_2$ is closed, all of the resistance winding 86 (Fig. 1E) is in series with the filament 52 so that the latter is not ignited. However, as the operation of the turbine 34 increases the pressure differential between the interior and the exterior of the packer 31, the resistance winding 86 is gradually cut out. This continues until the packer 31 is fully expanded, at which time the current flowing through the filament 52 is sufficient to ignite it. When that occurs, the explosive charge 51 in the annular recess 48 is ignited, thereby driving the projectile 49 a considerable distance into the formation 21.

The switch $S_3$ is then closed and the current is adjusted by means of the variable resistance R to the value required to ignite the filament 67 in the powder chamber 64. This ignites the explosive charge 66 contained within the chamber 64 and forces the valve 61 to the left against the screw 63. The reduced portion 62 of the valve 61 is now in registry with the passage 58 in the valve block 29 so that the chamber 55 communicates with the sample container 57.

At the same time, the switch $S_1$ is closed at the surface to energize the solenoid 76 and open the valve 70, thereby placing the sample container 57 in communication with the outer casing 30. Since the pressure within the sample container 57 and the casing 30 is relatively low (approximately atmospheric pressure), whereas the pressure of the fluid contained within the formation 21 is very much greater, such fluid will flow through the fluid inlet 46, the flexible tube 54, the chamber 55, the passage 58 and the sample container 57 to the interior of the casing 30. This flow continues until the pressure within the sample container 57 and the casing 30 is essentially that of the fluid in the formation 21.

The first liquid to enter the sample container 57 will be the bore hole liquid L originally contained within the flexible tube 54 and the chamber 55. This will pass through the aperture 69 in the plug 68 into the casing 30. If the portion of the formation 21 immediately surrounding the bore hole 22 is invaded with bore hole liquid, then the first fluid to flow from the formation 21 will probably be a mixture of oil and bore hole liquid which will also flow through the aperture 69 in the plug 68 into the casing 30. Eventually pure oil will flow from the formation 21 through the flexible tubing 54 and the chamber 55 into the sample container 57. At the conclusion of the test, the fluid sample contained within the sample container 57 will be largely pure oil and any impurities or bore hole liquid will be contained within the casing 30.

When the test has been completed, the switch $S_1$ at the surface is opened, thereby deenergizing the solenoid 76 and permitting the spring 71 to close the valve 70 upon its seat 69. The resistance R is then adjusted to give the current value required to ignite the filament 67' in the powder chamber 64' in the valve block 29. The explosive charge 66' contained within the powder chamber 64' is thus ignited and the explosion forces the valve 61' to the left against the screw 63'. The reduced portion 62' of the valve 61' is now moved out of registry with the passage 58. The passage 58 is accordingly blocked off so that the contents of the sample container 57 and the casing 30 cannot escape or become contaminated with the bore hole liquid L as the testing apparatus is moved from the vicinity of the formation 21.

When the valve 61' has been closed, as described above, the switch $S_2$ is opened to deenergize the motor 35 and bring the turbine 34 to rest. When the differential pressure created by the turbine 34 is removed, the natural resiliency of the packer 31 restores it to the position shown in dotted lines in Figure 1, lying flat upon the casing 28. The testing apparatus 20 may then be raised to the surface of the earth where the samples contained in the sample container 57 and the casing 30 may be recovered and tested in the usual manner. At the surface, the screws 63 and 63' in the block 29 are unscrewed a few turns to permit the valves 61 and 61' to move sufficiently to the left to enable the gas in the powder chambers 64 and 64' to escape without danger to the operator.

Since the chamber 55 is always in communication with the fluid inlet 46, the pressure therein and consequently the pressure recorded by the pressure recorder 56 is always very nearly equal to the pressure existing in the vicinity of the fluid inlet 46 in the packer 31. Accordingly, the pressure recorder 56 will indicate an increase in pressure as the testing apparatus 20 is lowered into the bore hole 22, a drop in pressure as the valve 61 in the valve block 29 is opened, an increase in pressure as the fluid contained in the formation 21 flows into the sample container 57 and a decrease in pressure as the testing apparatus is brought out of the bore hole 22. Hence, the pressure recorder 56, when used as described above, enables the operation of the valves 61 and 61' in the valve block 29 to be checked in addition to recording bore hole and formation pressures.

In Figure 1D is illustrated a modified form of fluid inlet which may be used in place of fluid 46, if desired. Referring to Figure 1D, the fluid inlet comprises a tubular member 93 having a forward threaded portion 94 and terminating in a conical portion 95. Mounted on the threaded portion 94 of the tubular member 93 is a conical fitting 96 which is adapted to be screwed down tightly on the edge of the packer material as shown in the figure for the purpose of securing the fluid inlet to the packer 31. Threadedly mounted on the tubular member 93 is a sleeve 97 having an annular groove 98 formed in the interior wall thereof which communicates with an aperture 98a formed in the lower wall of the sleeve 97. The aperture 98a in turn communicates with the flexible tube 54. A plurality of narrow passages 99 are provided in the tubular member 93 which provide communication between the interior thereof and the annular recess 98.

Within the tubular member 93 is snugly fitted a hollow projectile 100 having a powder chamber 101 therein containing an explosive charge 102. The charge 102 is adapted to be ignited by means of an igniting filament 103, one end of which is grounded to the projectile 100 at the point 104 and the other end of which is connected to an insulated contact 105. The contact 105 extends through a rear closure member 106 fitted on the projectile 100 and normally engages an insulated contact member 107, mounted in a plug 108 threadedly fitted at the rear end of the tubular member 93 and which is connected to the conductor 92 (Fig. 1C).

A flexible plug 109 made of rubber or other suitable material is forced against the forward portion of the projectile 100 and it serves to prevent bore hole liquid L from leaking through to the explosive charge 102 contained therein. It also prevents the bore hole liquid L from leaking through the passages 99 in the tubular member 93.

When the filament 103 is ignited by closing the switch S₂ (Fig. 1C), as indicated above, the explosive charge 102 is ignited, thereby driving the projectile 100 into the formation 21 which is to be tested. The fluid thereupon flows from the formation 21 to the interior of the tubular member 93 and it passes through the passages 99 to the annular space 98 and thence to the flexible tube 54. Inasmuch as the passages 99 are of relatively small cross-section, they serve to screen out relatively large particles of material which may be included with the fluid from the formation 21.

The embodiment shown in Figure 2 differs from that illustrated in Figure 1, in that the sample receiving tank is placed above instead of below the packer, so that tests may be conducted near the bottom of a bore hole. At the upper end of the testing apparatus 20 is disposed a hermetically sealed sample receiving tank 110 within which is disposed a vertical tube 111, the lower end of which extends into an aperture 112 formed in the bottom of the sample receiving tank 110. Attached to the lower end of the tank 110 is the casing 28 on which the packer 31 is mounted. As in the embodiment shown in Figure 1, the fluid inlet 46 is connected to the flexible tube 54, the free end of which is mounted on a nipple 113 formed on a transverse closure member 114 fitted within the casing 28 above the aperture 44 therein.

Spaced above the transverse closure member 114 is a second transverse closure member 115 forming a chamber 116 in the casing 28 within which the pressure recorder 56 is mounted. The transverse closure member 115 is provided with an aperture 117 within which is seated a valve 118. The valve 118 is mounted on a valve stem 119 and is normally maintained closed by means of a compression spring 120, the lower end of which is seated on a transverse member 121 formed within the casing 28 and the upper end of which engages the lower face of a disc 122 mounted on the valve stem 119. The transverse member 121 is provided with a plurality of apertures 121a permitting the passage of fluid to the tube 111. In this modification also, the valve stem 119 is adapted to be moved downwardly to open the valve 118 by means of the solenoid 76 which is connected as shown in Figure 1C.

The motor 35 and the turbine 34 are mounted in a casing 28a which lies within and is concentric with the casing 28. The lower portion of the casing 28 is closed off by means of a rounded plug 123 within which are provided a plurality of inlet ports 124 for supplying the bore hole liquid L to the turbine 34. The bore hole liquid L passes from the turbine 34 through a plurality of outlet ports 125 formed in the casing 28 to the space between the packer 31 and the casing 28. The annular space 45' between the casings 28 and 28a serves as an equalizing conduit like the conduit 45 in Figure 1.

This modification operates essentially like the embodiment described above and illustrated in Figure 1, except that the bore hole liquid L initially contained in the flexible tube 54 and the fluid from the formation 21 pass up through the tube 111 and into the sample tank 110. An almost pure uncontaminated sample is retained in the space between the transverse closure member 115 and the bottom of the tank 110.

In the embodiment illustrated in Figure 3 of the drawings, the packer 31 is provided with a non-expanding portion 127 which is located intermediate its ends. In the non-expanding portion 127 are provided a plurality of apertures 128 through which fluid from the formation 21 to be tested may pass to a chamber 129 formed by two transverse plates 130 and 131 within the casing 28. In the plate 131 is formed an aperture 132 in which is fitted a conduit 133, the upper extremity of which is fitted into an aperture 134 formed in the transverse closure member 135 in the casing 28. The fluid sample transmitted through the conduit 133 passes into the chamber 116 and is collected in the sample retaining tank 110 and in the space between the transverse closure member 115 and the bottom of the sample tank 110, as described above in connection with Figure 2.

In order that the turbine 34 may expand both halves of the packer 31, it is provided with an outlet port 136 communicating with a conduit 137 which in turn communicates with the two halves of the packer 31 through the conduits 138 and 139. The bore hole liquid L is supplied to the turbine 34 through a plurality of inlet ports 140 formed in the lower portion of the casing 28. In this embodiment, the motor 35 is located in the lower portion of the casing 28 below the turbine 34 and test samples are obtained essentially in the same manner as described above in connection with Figures 1 and 2.

Figure 4:
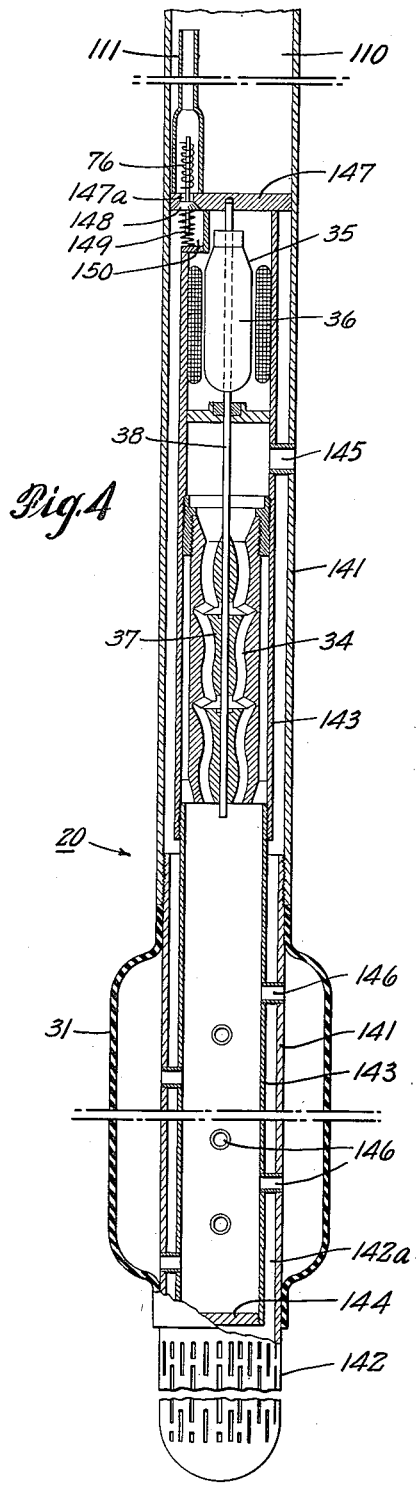
Figure 4 is a view in vertical section illustrating a further modification of the invention which is designed to permit testing at the bottom of a bore hole or of an entire zone below the packer.

The embodiment illustrated in Figure 4 is designed especially for testing formations at the very bottom of a bore hole. In this embodiment, the packer 31 is mounted near the lower extremity of the testing apparatus 20 on a casing 141 to the lower end of which is secured a conventional type slotted strainer 142. Mounted concentrically within the casing 141 is a tubular casing 143 which is closed off at its lower end by a transverse closure member 144 and at the upper end of which is mounted the turbine 34.

The turbine 34 is adapted to be driven by the motor 35 as described above and it receives bore hole liquid L through a conduit 145 extending from the outer casing 141 to the inner casing 143. The fluid output of the turbine 34 is introduced directly into the interior of the casing 143 and through a plurality of conduits 146 to the space between the packer 31 and the casing 141.

The test fluid from the formation passes through the strainer 142 and through the annular space 142a between the casings 141 and 143 to a transverse closure member 147 formed in the upper portion of the casting 141. The closure member 147 is provided with an aperture 147a in which is seated a valve 148. The valve 148 is normally maintained closed by a compression spring 149, the lower end of which is seated in a recess 150 and the upper end of which engages the lower face of the valve 148. The valve 148 is adapted to be actuated by means of the solenoid 76 which is energized through the conductor 24 in the cable 23 (Fig. 1C). This embodiment operates like the modifications shown in the figures described above and the test sample is obtained in the sample retaining tank 110.

Figure 5 illustrates a modification of the invention which is adapted to be attached in any suitable manner to an empty string of pipe 151 and lowered into the bore hole 22 thereby. When the testing apparatus 20 has been lowered to the desired level in the bore hole 22, the cable 23 containing the conductors 24, 25 and 26 is lowered through the string of pipe 151. In order to facilitate the lowering of the cable 23 through the pipe 151, a sinker bar 152 is attached to its lower end. The maximum outside diameter of the sinker bar 152 is less than the minimum inside diameter of the string of pipe 151. Mounted at the lower end of the sinker bar 152 is a plug type contact making device which is adapted to cooperate with a socket in the string of pipe 151 for connecting the respective conductors in the cable 23 to the circuits in the testing apparatus 20.

The plug on the sinker bar 152 comprises a plurality of concentric contacts 153, 154 and 155 which are insulated from each other and from the sinker bar 152 and which are electrically connected to the conductors 24, 25 and 26, respectively, in the cable 23. Secured to a transverse member 156a within the string of drill pipe 151 is an inverted socket 156, having a plurality of metal sockets 157, 158 and 159, respectively, within which the plugs 153, 154 and 155 are adapted to be received. The sockets 157, 158 and 159 are electrically connected to the three circuits in the testing apparatus, as shown generally in Figure 1C.

In order to facilitate the entry of the sinker bar 152 into the socket 156, the lower portion of the sinker bar 152 is tapered inwardly at 160 and the upper portion of the socket 156 is tapered outwardly at 161. The sinker bar 152 is also provided with a plurality of centering springs 162 which keep it in a central position in the string of pipe 151.

If the sinker bar 152 is made heavy enough it will tend to remain within the socket 156 without providing special means for this purpose. However, where it is not heavy enough to accomplish this, a holding coil 163 may be wound on the outside of the socket 156 and connected in series with one of the conductors in the cable 23, for the purpose of preventing the sinker bar 152 from being pushed upwardly during the test. The holding coil 163, when energized, produces a magnetic force which holds the sinker bar 152 and its contacts in position while the test fluid flows upwardly into the string of pipe 151, as described in greater detail hereinafter.

Below the socket 156 is mounted a transverse partition 165 in which is formed an aperture 166 seating a valve 167. The valve 167 is normally maintained closed by a compression spring 168 and it is adapted to be opened by energizing the solenoid 76 in the manner described above. Spaced below the transverse partition 165 is a second transverse partition 169 forming a chamber 170' within which is disposed the pressure recording device 56.

The packer 31 is mounted on a casing 170 and the test fluid is supplied through the fluid inlet 46 and the flexible tube 54 to the chamber 170'. The motor 35 and the turbine 34 are mounted within a casing 171 which is disposed concentrically within the casing 170. The bore hole liquid L is supplied to the turbine 34 through a plurality of apertures 172 formed in the lower portion of the outer casing 170. Liquid under pressure is transmitted from the turbine 34, through a plurality of apertures 173 formed in the inner casing 171 and through an aperture 174 in the outer casing 170 to the space between the packer 31 and the casing 170.

The mode of operation of this modification is similar to that of the modifications previously described except that the testing apparatus 20 is lowered and supported on the string of pipe 151 instead of an electrical cable. In addition, the string of pipe 151 serves as a container for the fluid sample, apertures 164 being provided in the transverse member 156a to permit the test fluid to flow into the string of pipe 151.

In Figures 6, 6A and 7 is illustrated a modified form of plug and socket contact device similar to that shown in Figure 5. In this modification the sinker bar 152 is adapted to be locked within the string of pipe 151 by means of a plurality of locking arms 175, 175a, 176 and 176a (Fig. 7) which are slidably mounted within the apertures 177, 177a, 178 and 178a, respectively, in the sinker bar 152.

The arms 175 and 175a are provided with downwardly extending V-shaped portions 179 and 179a, respectively, which are adapted to fit within corresponding V-shaped recesses 181 and 181a formed in an actuator member 183. Similar V-shaped portions and recesses (not shown) are also provided for the arms 176 and 176a. The actuator member 183 is provided at its upper extremity with a conical portion 184 and it is mounted on a rod 185 secured to a tension spring 186 which maintains the locking arms 175, 175a, 176 and 176a normally in the retracted position shown in Figure 6. Ball rolling members 175' are provided on the locking arms to reduce friction and to facilitate the movement of the parts.

The rod 185 extends through a solenoid 187 which may be connected in series with one of the conductors in the cable 23. When the solenoid 187 is energized, it moves the rod 185 downwardly within the string of drill pipe 151. When this occurs, the upper portion 184 of the actuator member 183 moves the locking arms 175, 175a, 176 and 176a outwardly into an annular recess 188 formed in the interior wall of the string of pipe 151, as shown in greater detail in Figure 6A. As long as the winding 187 is energized, therefore, the sinker bar 152 will be securely locked to the string of pipe 151.

When the winding 187 is deenergized, the tension spring 186 raises the rod 185 thereby moving the locking arms 175, 175a, 176 and 176a radially and inwardly out of engagement with the annular recess 188, releasing the sinker bar 152 and enabling it to be withdrawn from the socket 156.

Figure 8:
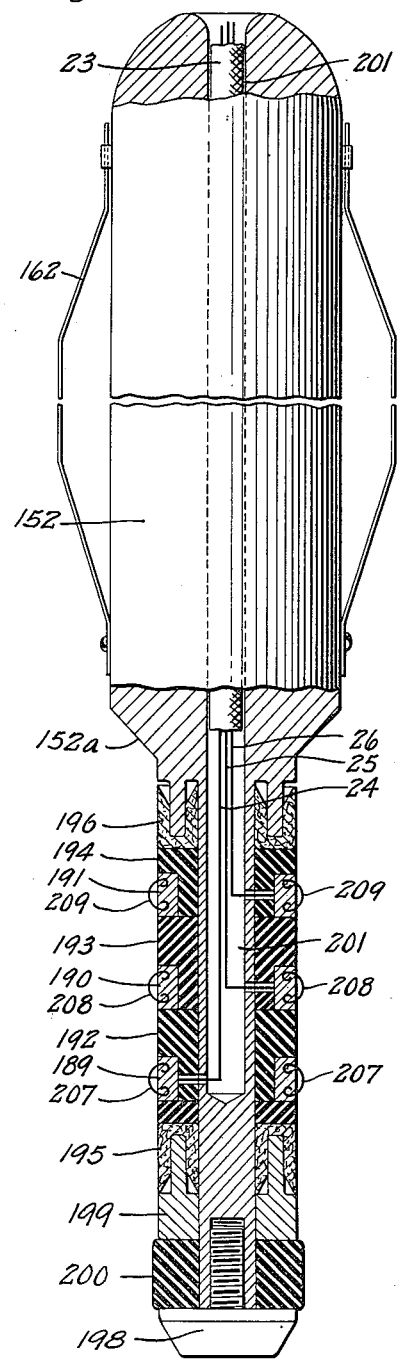
Figures 8 and 8A are views partially in section of another form of plug and socket means similar to that shown in Figure 6.
Figure 8A:
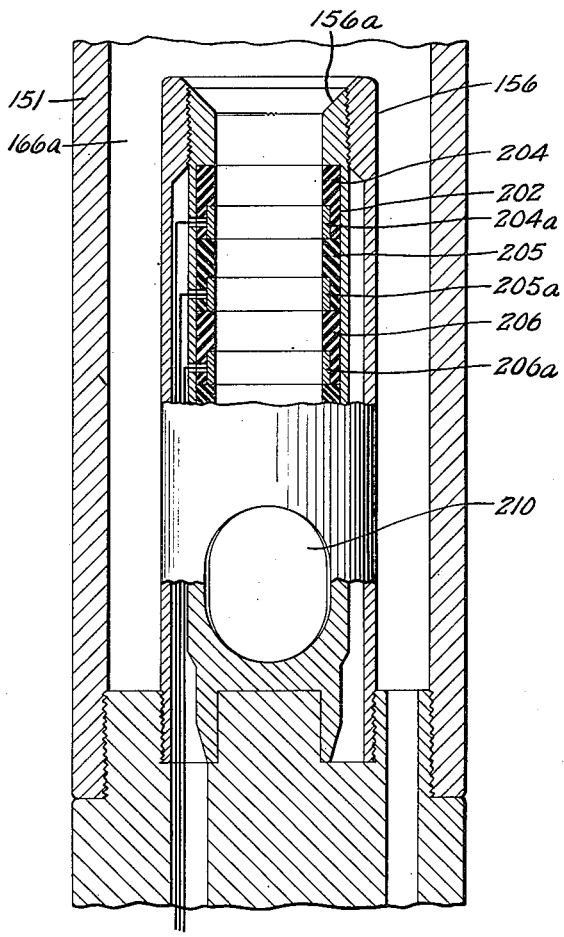

Another form of plug and socket contact making device is shown in Figures 8 and 8A. In this modification, the conductors 24, 25 and 26 in the cable 23 are connected to three vertically spaced apart contacts 189, 190 and 191 embedded in cylindrical blocks of insulating material 192, 193 and 194, respectively. The blocks of insulating material 192, 193 and 194 are mounted between a pair of gaskets 195 and 196 and are secured to the anchor bar 152 by means of a tap screw 198 tightened down on a spacer 199 and a rubber wiping collar 200. If desired, the hole 201 in the sinker bar 152 through which the cable 23 passes may be filled with oil, asphalt or other suitable insulating material in order to keep out water and ensure proper insulation of the conductors 24, 25 and 26.

As shown in Figure 8A, the socket 156 is provided with an annular recess 202 within which are inserted a plurality of cylindrical members 204, 205 and 206 made of insulating material, in which are embedded a plurality of contacts 204a, 205a nd 206a, corresponding to the contacts 191, 190 and 189, respectively. The contacts 204a, 205a and 206a are connected to the circuits in the testing apparatus 20, as indicated generally in Figure 1C. In order to ensure a good contact, each of the contacts 189, 190 and 191 is provided with a contact spring 207, 208 and 209, respectively.

In the lower portion of the wall of the socket 156 is formed an aperture 210 which permits any debris or liquid to escape. The aperture 210 is so located that when the sinker bar 152 is fitted in operating position in the socket 156, the upper edge of the rubber gasket 200 lies above the upper edge of the aperture 210.

When it is desired to place the testing apparatus 20 in the bore hole 22 in electrical communication with the surface, the apparatus of Figure 8 is lowered into the bore hole 22 inside the drill pipe 151 on the electric cable 23. The apparatus 20 is of the proper size and shape to pass freely through the pipe 151 and, being properly centered, the lower end of the sinker bar 15 will enter the socket 156 of Figure 8A. The rubber gasket 200 is designed to fit tightly in the socket 156 and it wipes any foreign material from the socket 156 as it enters. The leather gaskets 196 and 195, together with the cooperating tapered surfaces 152a and 156a on the sinker bar 152 and the socket 156, respectively, tend to keep any other foreign material from getting between the plug and socket. There may be a thin layer of water between the plug and socket, but the electrical resistance of such a thin layer is relatively high and causes no appreciable amount of current to flow between the various conductors. The sinker bar 152 is streamlined and heavy enough to prevent it from being moved as the test fluid passes between it and the drill pipe 151 through the passage 166a.

If desired, the electric cables for energizing the testing apparatus 20 from the surface of the earth may be eliminated by incorporating a source of electrical energy in the testing apparatus 20, as illustrated in Figure 9, in which the testing apparatus 20 is essentially like that shown in Figure 5. Referring to Figure 9, a suitable source of electrical energy 211 which may be a battery, for example, is located within a chamber 212 in the casing 170 on which the packer 31 is mounted. As shown in greater detail in Figure 9A, one terminal of the source of electrical energy 211 is grounded at 213 and the other terminal is connected through a conductor 214 to a conventional timing device 215.

The timing device 215 is designed to connect the conductor 214 first to one terminal of the motor 35 which operates the turbine 34 and at a predetermined time later when the packer 31 has been expanded, also to one terminal of a motor 216 which serves to open the valve 167 in the transverse closure member 165. The other terminals of both the motors 35 and 216 are connected to ground at the point 217. After a predetermined time has elapsed and no further test fluid flows from the formation 21, the timing device 215 is designed to shut off both the motors 35 and 216.

In operation, the timing device 215 is initially adjusted so that it makes no contacts until a given period of time has elapsed, which period of time is long enough to permit the testing apparatus 20 to be lowered to the desired level in the bore hole 22. The testing apparatus 20 is then lowered into the bore hole 22 to the vicinity of the formation 21 which is to be tested. After the chosen period of time has elapsed, the timing device 215 connects the conductor 214 to the motor 35 so that it is energized to operate the turbine 34 and expand the packer 31 into engagement with the wall of the bore hole 22. A short time thereafter, the timing device 215 also connects the conductor 214 to the motor 216 which opens the valve 167, permitting the test fluid from the formation 21 to flow through the fluid inlet 46, the flexible tube 54 and into the string of drill pipe 151 above the transverse closure member 165. The valve 167 remains open for a predetermined length of time and then closes, at which time the motor 35 is deenergized, permitting the packer 31 to collapse due to its own elasticity as described above.

In certain cases it may be desirable to attach other well servicing apparatus below the packer 31. For example, as shown in Figure 9, a conventional type reaming apparatus 218 may be attached to the casing 170 below the packer 31 for the purpose of reaming out the bore hole 22 before beginning the testing operation.

Figure 10:
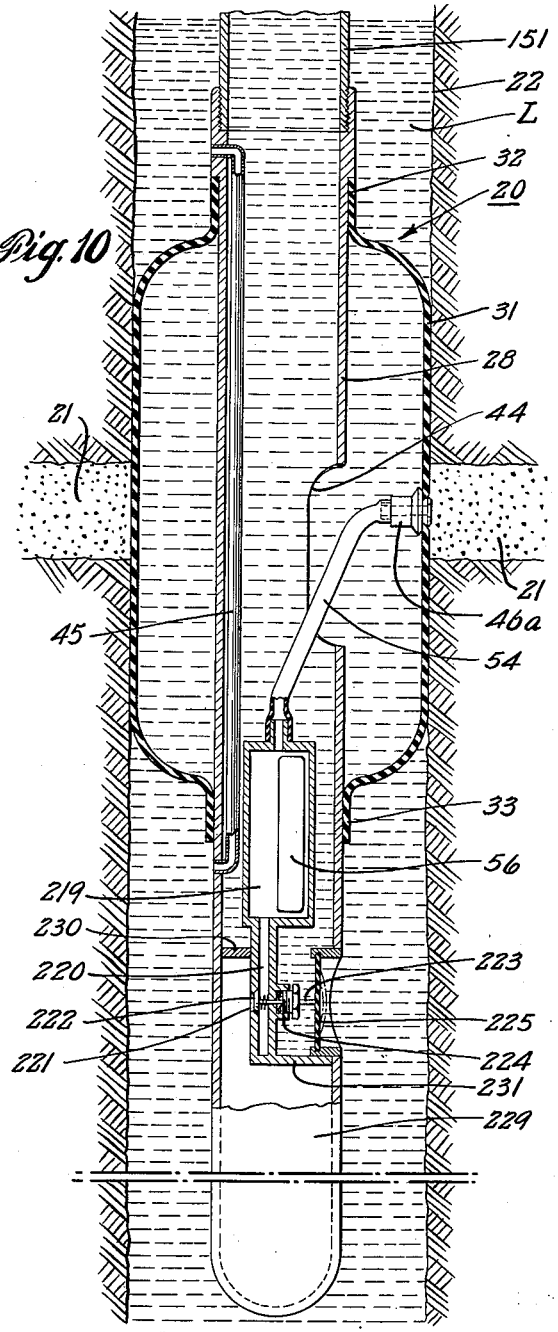
Figure 10 is a view in longitudinal section of another modified form of testing apparatus adapted to be used on a drill pipe, in which the packer is expanded by introducing a fluid under pressure within the drill pipe.

In the embodiment illustrated in Figure 10 of the drawings, no electrical control apparatus is used but the testing apparatus 20 is operated by the pressure of liquid introduced into the string of pipe 151 on which the testing apparatus 20 is supported in the bore hole 22. In this embodiment, the casing 28 on which the packer 31 is mounted is threadedly secured to the lower end of the string of pipe 151. The flexible tube 54 which is connected to the fluid inlet 46a communicates with a chamber 219 within which is disposed the pressure recording device 56.

The lower end of the chamber 219 communicates with a closed conduit 220 having an aperture 221 formed in the side wall thereof within which is seated a valve 222. The valve 222 is mounted on a valve stem 223 which extends through the conduit 220 and through conventional packing means 224 and is secured to a diaphragm 225 mounted in the wall of the casing 28. The lower portion 229 of the casing 28 is closed off by suitable transverse closure members 230 and 231 so as to constitute a sample receiving tank for the test fluid.

In operation, fluid under pressure is introduced into the drill pipe 151 and it passes through the aperture 44 in the casing 28, thereby expanding the packer 31 into engagement with the wall of the bore hole 22. The fluid may be water or some liquid less dense than the bore hole liquid, and it may be introduced into the empty string of pipe 151 intermittently as the testing apparatus 20 is lowered into the bore hole 22 or after the latter has been lowered to the desired level.

The pressure of the fluid introduced within the drill pipe 151 acts on one face of the diaphragm 225, the other face being subjected to the pressure of the liquid L in the bore hole. However, even after the drill pipe 151 is filled, the pressure on the outside of the diaphragm 225 is greater than that on the inside because of the difference in density between the fluid inside and outside the pipe 151 and also because of the low pressure in the lower sample receiving portion 229 of the casing 28.

As the pressure of the liquid within the drill pipe 151 is increased, by a pump at the surface (not shown), for example, the diaphragm 225 moves outwardly to the position shown in dotted lines in Figure 10, thus opening the valve 222 and permitting the test fluid to flow from the formation 21 through the fluid inlet 46a, the flexible tube 54, the chamber 219, the conduit 220 and the aperture 221 therein into the lower portion 229 of the casing 28. After the desired quantity of sample has been taken, the pressure of the liquid within the drill pipe 151 is reduced and the inherent resiliency of the packer 31 restores it to its normal inoperative position upon the casing 28, permitting it to be readily withdrawn from the bore hole 22. When the differential pressure on each side of the diaphragm 225 drops to a predetermined value, the valve 222 closes, thereby preventing any contamination of the sample contained within the lower portion 229 of the casing 28 by the bore hole liquid L.

It will be apparent that the several embodiments described above may be modified in many respects within the scope of the invention. For example, instead of supporting the testing apparatus on a drill pipe or multi-conductor cable, a single conductor cable may be used, in conjunction with suitable relays or timing devices, or a cable having any desired number of conductors may be employed. Also, while representative electrical circuits have been shown and described, other suitable circuits may be utilized with good results.

It will also be apparent that the applicant's novel testing means can be adapted for use on a conventional wire line or cable having no insulated conductors by using a pre-timing means, for example, as described above in connection with Figure 9. Conventional current or voltage regulating means may also be disposed adjacent the testing apparatus for protecting the electrical elements thereof.

Where it is desired to make formation tests at different levels during the same run, a plurality of sample containing tanks may be used, having their valves connected in parallel instead of in series. At each level, the valves for a corresponding tank are opened, enabling a plurality of different samples to be obtained.

The explosive operated valves 61 and 61' shown in Fig. 1B are particularly useful where the pressures encountered are exceptionally high, as in a very deep hole. These valves are also particularly adapted for use in operations where a considerable period of time elapses between the lowering of the apparatus into the bore hole and the opening of the valves. Their use is also desirable in holes that are in poor condition and are partially plugged or are very crooked. However, at moderate depths, solenoid operated poppet valves may be used. In many cases, the valve 61' can be omitted or a plunger similar to the valve 61 may be used as a precautionary measure to prevent any bore hole liquid from leaking into the sample containers.

One or more electrodes might also be affixed to the testing apparatus and utilized in electrical logging or well surveying operations, if desired.

While several representative embodiments of the invention have been described in detail hereinabove, the invention is not intended to be restricted thereto, but those embodiments are susceptible of numerous changes in form and detail within the scope of the appended claims.

I claim:

1. Bore hole testing apparatus comprising a casing adapted to be lowered on a cable into a bore hole containing liquid, an expansible packer sleeve mounted on the casing, turbine mechanism in the casing for expanding the packer sleeve into packing position in the bore hole, said turbine mechanism having fluid inlet means communicating with said bore hole fluid and fluid outlet means communicating with the interior of the packer sleeve, an electric motor for driving the turbine mechanism, a source of electrical energy at the surface of the earth, an electrical circuit, including a conductor in the cable, connected to said source and motor, test fluid inlet means carried by the packer sleeve and intermediate the ends thereof, sample containing means disposed in the casing, conduit means connected to said test fluid inlet means and sample containing means, and valve means in said conduit means.

2. Bore hole testing apparatus comprising a casing adapted to be lowered on a cable into a bore hole containing liquid, a packer mounted on the casing, turbine mechanism in the casing below the packer for expanding the packer into packing position in the bore hole, said turbine mechanism having fluid inlet means in the lower portion of the casing communicating with said bore hole fluid and fluid outlet means communicating with the interior of the packer, an electric motor for driving the turbine mechanism, a source of electrical energy at the surface of the earth, an electrical circuit, including a conductor in the cable, connected to said source and motor, test fluid inlet means mounted on the packer and intermediate the ends thereof, sample containing means disposed in the casing above the packer, conduit means connected to said test fluid inlet means and sample containing means, and valve means in said conduit means.

3. In bore hole testing apparatus, electrical control means responsive to the pressure differential between two fluids, comprising a housing, spring biased piston means slidably mounted in the housing and responsive to the said pressure differential, and electrical means actuated by the piston means, and providing an electrical output related to said pressure differential.

4. In apparatus for testing bore holes containing liquid, the combination of an expansible packer adapted to be lowered into a bore hole, means for producing a fluid pressure differential between the interior and exterior of said packer to expand it to packing position, fluid inlet means in the packer intermediate the ends thereof, said inlet means comprising a hollow tubular member having a hollow projectile therein, a fluid container communicating with said fluid inlet means, and means rendered operative at a predetermined pressure differential between the interior and exterior of the packer for impelling said projectile into a formation.

MAURICE MENNECIER.

REFERENCES CITED

The following references are of record in the file of this patent:

UNITED STATES PATENTS

| Number | Name | Date |
| --- | --- | --- |
| 1,523,286 | Railsback | Jan. 13, 1925 |
| 1,736,254 | Davis | Nov. 19, 1929 |
| 1,850,218 | Thomas | Mar. 22, 1932 |
| 2,055,506 | Schlumberger | Sept. 29, 1936 |
| 2,059,629 | Erwin et al. | Nov. 3, 1936 |
| 2,092,337 | Spencer | Sept. 7, 1937 |
| 2,119,361 | Schlumberger | May 31, 1938 |
| 2,143,962 | Stone | Jan. 17, 1939 |
| 2,189,919 | Moore | Feb. 13, 1940 |
| 2,222,750 | Litolf | Nov. 26, 1940 |
| 2,222,829 | Humason et al. | Nov. 26, 1940 |
| 2,225,461 | Reynolds | Dec. 17, 1940 |
| 2,262,655 | Seale | Nov. 11, 1941 |
| 2,297,020 | Page | Sept. 29, 1942 |
| 2,301,624 | Holt | Oct. 10, 1942 |